United States Patent
Walley et al.

(10) Patent No.: US 8,665,735 B2
(45) Date of Patent: Mar. 4, 2014

(54) METHOD AND SYSTEM FOR QUALITY OF SERVICE MANAGEMENT IN A MULTI-STANDARD MESH OF NETWORKS

(75) Inventors: John Walley, Ladera Ranch, CA (US); Arya Behzad, Poway, CA (US); Mark Buer, Gilbert, AZ (US); Jeyhan Karaoguz, Irvine, CA (US); Alexander G. MacInnis, Ann Arbor, MI (US); Thomas Quigley, Franklin, NC (US)

(73) Assignee: Broadcom Corporation, Irvine, CA (US)

( * ) Notice: Subject to any disclaimer, the term of this patent is extended or adjusted under 35 U.S.C. 154(b) by 267 days.

(21) Appl. No.: 11/971,332

(22) Filed: Jan. 9, 2008

(65) Prior Publication Data

US 2009/0022061 A1    Jan. 22, 2009

Related U.S. Application Data

(60) Provisional application No. 60/950,994, filed on Jul. 20, 2007.

(51) Int. Cl.
| | |
|---|---|
| *H04J 1/16* | (2006.01) |
| *H04J 3/14* | (2006.01) |
| *H04J 3/16* | (2006.01) |
| *H04J 3/22* | (2006.01) |
| *H04L 1/00* | (2006.01) |
| *H04L 12/26* | (2006.01) |
| *H04W 40/12* | (2009.01) |

(52) U.S. Cl.
USPC .......................................... 370/252; 370/465

(58) Field of Classification Search
None
See application file for complete search history.

(56) References Cited

U.S. PATENT DOCUMENTS

| | | | |
|---|---|---|---|
| 6,693,912 B1 * | 2/2004 | Wang | 370/401 |
| 6,711,137 B1 | 3/2004 | Klassen et al. | |
| 6,747,968 B1 * | 6/2004 | Seppala et al. | 370/338 |
| 6,760,766 B1 | 7/2004 | Sahlqvist | |
| 6,785,237 B1 * | 8/2004 | Sufleta | 370/236 |

(Continued)

FOREIGN PATENT DOCUMENTS

| | | |
|---|---|---|
| CN | 1306364 A | 8/2001 |
| CN | 1997979 A | 7/2007 |

(Continued)

OTHER PUBLICATIONS

European Search Report corresponding to European Application Serial No. 08012487.8-2416, mailed Oct. 28, 2008, 3 pages.

(Continued)

*Primary Examiner* — Suk Jin Kang
(74) *Attorney, Agent, or Firm* — Thomas Horstemeyer, LLP

(57) ABSTRACT

Aspects of a method and system for quality of service management in a multi-standard mesh of networks are provided. In a wireless mobile communication device (WMCD) enabled to communicate utilizing a variety of communication networks, QoS information, such as latency, available bandwidth, and/or throughput, communicated to the WMCD may enable the coordination of data transfers to and/or from the WMCD. In this regard, the WMCD and each of the networks may comprise a QoS management entity. A QoS management entity may be enabled to poll other QoS management entities to discover QoS information. Similarly, a QoS management entity may be enabled to receive QoS information broadcast by other QoS management entities. A QoS management entity may enable selecting a network and/or communication protocol for the transmission and/or reception of data based on exchanged QoS information.

28 Claims, 6 Drawing Sheets

(56) References Cited

U.S. PATENT DOCUMENTS

| | | | |
|---|---|---|---|
| 7,099,277 | B2 | 8/2006 | Sahinoglu |
| 7,142,563 | B1 * | 11/2006 | Lin .............................. 370/469 |
| 7,180,855 | B1 * | 2/2007 | Lin .............................. 370/230 |
| 7,583,700 | B1 * | 9/2009 | Lin .............................. 370/469 |
| 7,656,798 | B1 * | 2/2010 | Lin .............................. 370/230 |
| 2003/0095553 | A1 | 5/2003 | Shiomoto et al. |
| 2003/0107990 | A1 * | 6/2003 | Herschleb et al. ............ 370/229 |
| 2003/0156543 | A1 | 8/2003 | Sahinoglu |
| 2003/0210665 | A1 * | 11/2003 | Salmenkaita et al. ........ 370/330 |
| 2004/0156341 | A1 * | 8/2004 | Cheng et al. .................. 370/335 |
| 2004/0252699 | A1 * | 12/2004 | Drevon et al. ............ 370/395.21 |
| 2005/0089042 | A1 * | 4/2005 | Ruutu et al. ............. 370/395.21 |
| 2005/0094609 | A1 * | 5/2005 | Tandai et al. .................. 370/338 |
| 2005/0111487 | A1 * | 5/2005 | Matta et al. .................... 370/468 |
| 2005/0185653 | A1 | 8/2005 | Ono et al. |
| 2005/0213509 | A1 * | 9/2005 | Collomb et al. .............. 370/252 |
| 2006/0120329 | A1 * | 6/2006 | Kim et al. ..................... 370/331 |
| 2006/0262737 | A1 * | 11/2006 | Livet et al. .................... 370/254 |
| 2007/0110009 | A1 | 5/2007 | Bachmann et al. |
| 2007/0280102 | A1 | 12/2007 | Vasseur |
| 2008/0013545 | A1 * | 1/2008 | Ono et al. ................. 370/395.21 |
| 2008/0107074 | A1 * | 5/2008 | Salmenkaita et al. ........ 370/330 |
| 2008/0212583 | A1 * | 9/2008 | Rey et al. ....................... 370/390 |
| 2008/0279139 | A1 * | 11/2008 | Beziot et al. .................. 370/329 |
| 2009/0022061 | A1 | 1/2009 | Walley |
| 2009/0022091 | A1 | 1/2009 | Buer |
| 2009/0022092 | A1 | 1/2009 | MacInnis |
| 2009/0022096 | A1 | 1/2009 | Walley |
| 2009/0022116 | A1 | 1/2009 | Walley |
| 2009/0022117 | A1 | 1/2009 | Quigley |
| 2009/0022118 | A1 | 1/2009 | Behzad |
| 2009/0022119 | A1 | 1/2009 | Buer |
| 2009/0022120 | A1 | 1/2009 | Buer |
| 2009/0022122 | A1 | 1/2009 | Quigley |
| 2009/0022169 | A1 | 1/2009 | MacInnis |
| 2009/0023393 | A1 | 1/2009 | Behzad |
| 2009/0023422 | A1 | 1/2009 | MacInnis |
| 2009/0023423 | A1 | 1/2009 | Buer |
| 2009/0023428 | A1 | 1/2009 | Behzad |
| 2009/0023432 | A1 | 1/2009 | MacInnis |
| 2009/0023433 | A1 | 1/2009 | Walley |
| 2009/0023452 | A1 | 1/2009 | Quigley |
| 2009/0023454 | A1 | 1/2009 | MacInnis |
| 2009/0023457 | A1 | 1/2009 | Buer |
| 2009/0024641 | A1 | 1/2009 | Quigley |
| 2009/0024687 | A1 | 1/2009 | Quigley |
| 2009/0025081 | A1 | 1/2009 | Quigley |

FOREIGN PATENT DOCUMENTS

| | | |
|---|---|---|
| EP | 1 091 528 A | 4/2001 |
| KR | 2002-0067515 | 8/2002 |
| KR | 2004-0037637 | 5/2004 |
| WO | 01/35585 | 5/2001 |
| WO | 02/01807 | 1/2002 |
| WO | 03/081883 | 10/2003 |

OTHER PUBLICATIONS

Eriksson et al., "Providing quality of service in always best connected networks." IEEE Communications Magazine, Vo. 41, No. 7, Jul. 2003, pp. 154-163.

Seagate Technology LLC, Seagate D.A.V.E. (Digital Audio Video Experience) Transform the consumer digital content experience with the Seagate D.A.V.E. design concept, Data Sheet, 2007.

Seagate Technology LLC, Seagate D.A.V.E. (Digital Audio Video Experience) The portable storage platform that collects, plays and manages digital content, Product Overview, 2007.

Communication pursuant to Article 94(3) EPC corresponding to European Patent Application No. 08012487.8-2416, dated Apr. 1, 2010.

Office Action for CN1997979 mailed Feb. 15, 2012.

* cited by examiner

METHOD AND SYSTEM FOR QUALITY OF SERVICE MANAGEMENT IN A MULTI-STANDARD MESH OF NETWORKS

CROSS-REFERENCE TO RELATED APPLICATIONS/INCORPORATION BY REFERENCE

This patent application makes reference to, claims priority to and claims benefit from U.S. Provisional Patent Application Ser. No. 60/950,994 filed on Jul. 20, 2007.

The above stated provisional application is hereby incorporated herein by reference in its entirety.

FIELD OF THE INVENTION

Certain embodiments of the invention relate to communication networks. More specifically, certain embodiments of the invention relate to a method and system for quality of service management in a multi-standard mesh of networks.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. Numerous wireless solutions have been introduced, and have made a tremendous impact on everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth® (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intend to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services include such features as text messaging, video streaming, web browsing . . . etc.

Mobile wireless devices with various wireless technologies are another trend in the wireless world. For instance, WLAN systems may be operated in conjunction with WPAN systems to provide users with an enhanced overall functionality. For example, Bluetooth® technology may be utilized to connect a laptop computer or a handheld wireless terminal to a peripheral device, such as a keyboard, mouse, headphone, and/or printer, while the laptop computer or the handheld wireless terminal is also coupled to a campus-wide WLAN network through an access point (AP) located within the building.

Devices aimed at taking advantage of the capabilities of wireless networks may be described as Wireless mobile communication (WMC) devices. Today's WMC devices may comprise such devices as cellular phones, PDA's, laptops, and/or other devices.

One of the issues that may arise with the use of WMC devices is the availability of wireless connectivity. Because WMC devices are typically aimed at use-on-the-move devices, a WMC device, due to its user's movement, may be located outside the of wireless connectivity coverage area. For example, with such devices as mobile phones, it is not unusual for a user to drive out of cellular networks coverage area, especially when driving between towns. This may result in dropped calls or significantly degraded reception and/or services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided quality of service management in a multi-standard mesh of networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for quality of service management in a multi-standard mesh of networks. In a wireless mobile communication device (WMCD) enabled to communicate utilizing a variety of communication networks, QoS information, such as latency, available bandwidth, and/or throughput, communicated to the WMCD may enable the coordination of data transfers to and/or from the WMCD. In this regard, the WMCD and each of the networks may comprise a QoS management entity. A QoS management entity may be enabled to poll other QoS management entities to discover QoS information. Similarly, a QoS management entity may be enabled to receive QoS information broadcast by other QoS management entities. A QoS management entity may enable selecting a network and/or communication protocol for the transmission and/or reception of data based on exchanged QoS information. Aspects of the invention may also enable negotiation between QoS management entities to enable the reservation of resources for the transfer of data to and/or from the WMCD to a network. Additionally, a QoS management entity may be enabled to reconcile conflicts in a network. In various embodiments of the invention, a QoS management entity may enable selecting a network and/or communication protocol for the transmission and/or reception of data based on exchanged QoS information.

Figure 1A:
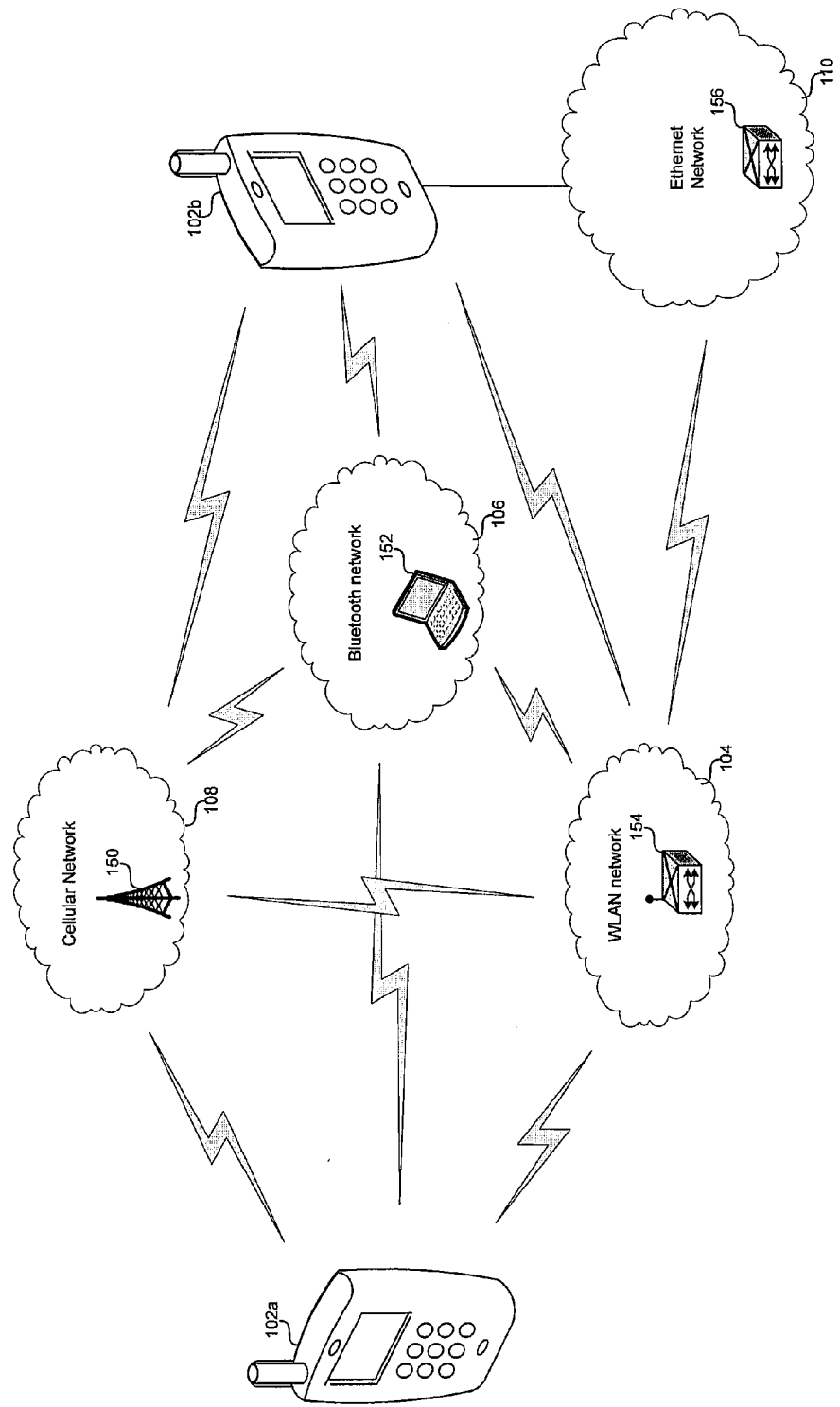
FIG. 1A is a diagram illustrating a mesh of networks comprising a plurality of communication standards, in accordance with an embodiment of the invention.

FIG. 1A is a diagram illustrating a mesh of networks comprising a plurality of communication standards, in accordance with an embodiment of the invention. Referring to FIG. 1A there shown communication devices 102, a WLAN network 104, a Bluetooth network 106, a cellular network 108, an Ethernet network 110, and a server 112.

The communication devices 102 may each comprise suitable logic, circuitry, and/or code that may enable transmission and/or reception of data via a plurality of communication standards. The communication devices may comprise an end user device or an end user wireless mobile terminal device comprising a user interface. For example, in the exemplary embodiment of the invention shown in FIG. 1A, the devices 102 may be enabled to transmit and/or receive multimedia information such as video, voice, and/or data via the WLAN network 104, Bluetooth network 106, the cellular network 108, or the Ethernet network 110.

The WLAN network 104 may comprise one or more network nodes that may enable wireless transmission and/or reception of data adhering to a wireless networking standard such as IEEE 802.11. In this regard, the WLAN network 104 may comprise one or more nodes 154 for communicating information between a source and a destination. In this regard, the nodes 154 may, for example, comprise, for example, routers, bridges, switches, computers, and/or wireless devices. When available, WLAN networks such the WLAN network 104 may provide a low cost, high bandwidth solution for transmitting data. However, WLAN coverage areas are generally limited to "hot-spots" and thus WLAN quality of service may be poor in areas where "hot-spots" are sparse or non-existent.

The Bluetooth (BT) network 106 may comprise one or more network nodes that may enable wireless transmission and/or reception of data adhering to Bluetooth standards/protocols. In this regard, the BT network 106 may comprise a one or more nodes 152 which may enable communicating data between a source BT device and a destination BT device. In this regard, the nodes 152 may, for example, comprise BT enabled devices coupled to coupled to form a piconet or a scatternet. For point-to-point or short range communications, BT networks such the BT network 106 may provide a low cost, high bandwidth solution for transmitting data. However, BT networks may be unable to provide a sufficient quality of service over longer distances.

The cellular network 108 may comprise one or more network nodes that may enable the wireless transmission and/or reception of data adhering to a cellular standard such as GSM or CDMA. The cellular network 108 may comprise one or more nodes 150, for communicating information between a source cellular device and a destination cellular device. In this regard, the nodes 150 may, for example, comprise base stations, for example. Cellular networks, such as the cellular network 108, may provide superior coverage areas as compared to other networking protocols. However, cellular networks may provide lesser bandwidth and/or be significantly more expensive than other networking protocols. Accordingly, a sufficient quality of service may unobtainable and/or too expensive for certain devices and/or applications.

The Ethernet network 110 may comprise one or more network nodes that may enable wireline transmission and/or reception of data adhering to Ethernet standards/protocols. In this regard, the Ethernet network 108 may comprise one or more nodes 156 for communicating information between a source node and a destination node. In this regard, the nodes 156 may, for example, comprise such as routers, bridges, switches, and end systems. When available, Ethernet networks such the Ethernet network 110 may provide high quality of service in terms of bandwidth and/or latency. However, the necessity of a wired connection to an Ethernet port makes Ethernet an unsuitable option for many devices and/or applications.

In an exemplary operation, the device 102a may need to transmit data to the device 102b. Accordingly, the device 102a may transmit the data via the WLAN network 104, the (BT) network 106, and/or the cellular network 108. Additionally, data transmitted via the WLAN may reach the device 102b via a wireless connection or via a wireline connection to the Ethernet network 110. Since multiple networks may be available, various embodiments of the invention may enable determining the best network choice. Accordingly, QoS Information of the various networks; latency, available bandwidth, and/or throughput, for example; may be utilized by the device 102a in determining how to transmit data to the device 102b. In this regard, QoS information associated with each network may be assessed and/or communicated to determine the best network or networks for transmitting and/or receiving a given piece of data. In this regard, data may be transmitted via one or more of the networks depending on which route meets quality of service and cost requirements for the transmission. For example, data may be transmitted from communication device 102a to the WLAN network 154, from the WLAN network 154 to the Bluetooth network 152, and from the Bluetooth network 152 to the communication device 102b.

Figure 1B:
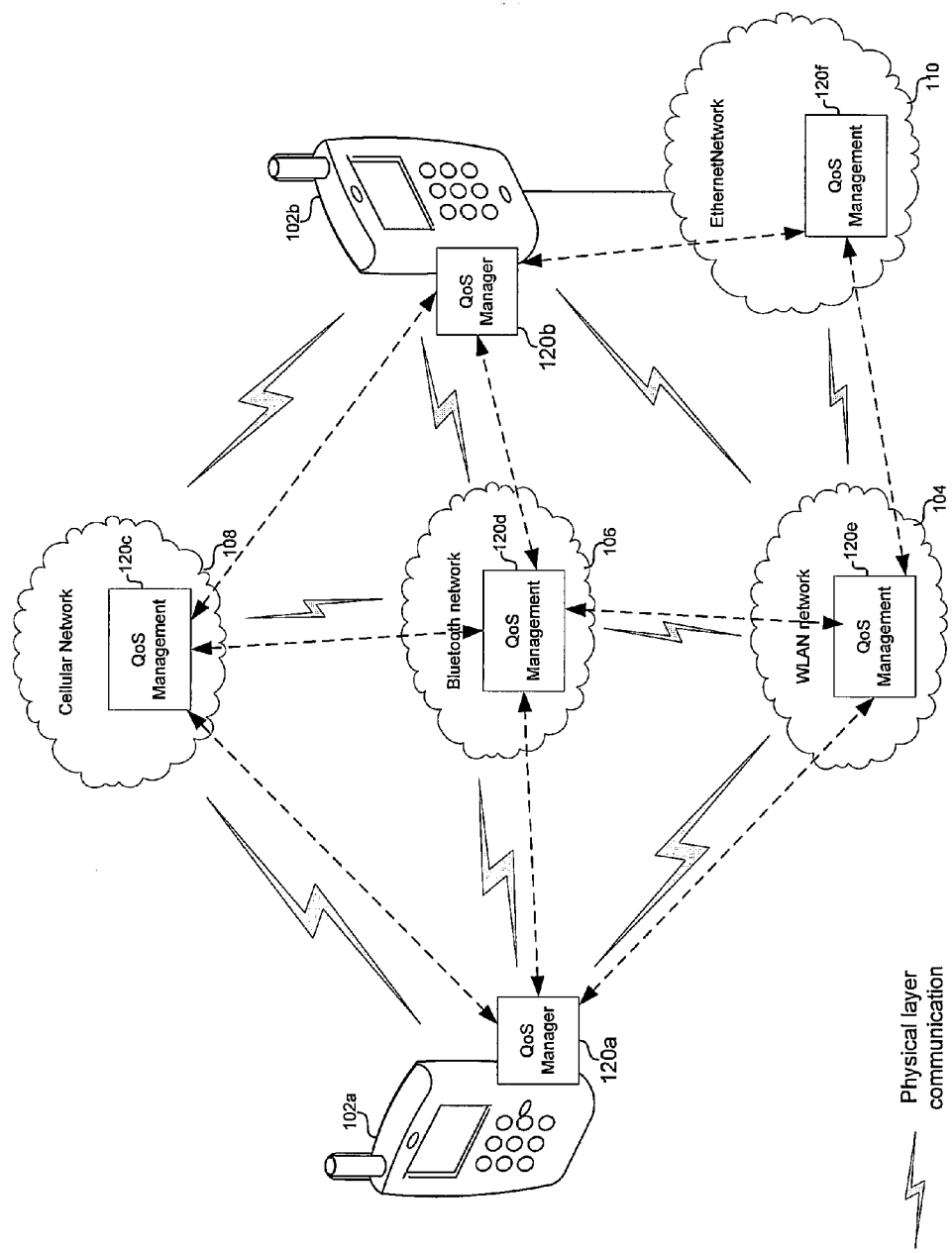
FIG. 1B illustrates a network utilizing quality of service (QoS) management, in accordance with an embodiment of the invention.

FIG. 1B illustrates a network utilizing Quality of Service management, in accordance with an embodiment of the invention. Referring to FIG. 1B there is shown a network similar to the network of FIG. 1, however, in FIG. 1B the devices 102a and 102b, and the networks 108, 106, 104, and 110 may comprises QoS management entities 120a, 120b, 120c, 120d, 120e, 120f, respectively. The QoS management entities 120a, 120b, 120c, 120d, 120e, 120f may each be referred to as QoS management entity 120.

The QoS management entity 120 may comprise suitable logic, circuitry, and/or code that may enable determining and/or communicating QoS information associated with a network. In this regard, the QoS management entity 120 may reside in dedicated hardware, and/or may comprise one or more blocks of code. Additionally, the QoS management entity may be implemented in one or more devices or entities within a network. For example, in one embodiment of the invention, each node in a network may comprise a QoS management entity. In various other embodiments of the invention, a QoS management entity may be implemented in specific entities such as edge nodes or core nodes. In another embodiment of the invention, a QoS management entity may reside in specific entities such as end systems or network edge devices coupled to a network.

Each of the QoS management entities 120 may be enabled to determine QoS information associated with a network in which the management entity resides. In this regard, a QoS management entity 120 may, for example, analyze the traffic through its respective network to determine, for example, latency, available bandwidth, and/or throughput. In one embodiment of the invention, a QoS management entity 120 may be enabled to flag one or more packets and then track the packets through its respective network. In another embodiment of the invention, a QoS management entity 120 may generate test traffic to specifically measure and/or test various metrics associated with its respective network. Accordingly, the QoS management entity 120c may enable determining the latency between two nodes, for example devices or base stations, comprising the network 108. Similarly, the QoS management entity 120d may enable determining the latency between two nodes, for example two piconet masters, comprising the BT network 106. Likewise, the QoS management entity 120e may enable determining the latency between two nodes, for example an ingress router and an egress router, comprising the network 104. Each QoS management entity 120 may be enabled to provide, for their respective networks, additional QoS information such as power dissipation information, monetary cost information, and/or whether the network provides guaranteed delivery or best effort delivery.

Each of the QoS management entities 120 may be enabled to communicate with other QoS management entities. In this manner, the QoS management entity 120a, for example, may be enabled to communicate with at least one of the QoS management entities 120c, 120d, and 120e; to determine QoS information, associated with the network 108, 106, and 104 respectively. In this regard, logical connection may exist between QoS management entities residing on different networks and/or devices. However, in order to communicate the QoS information via the different physical layers (i.e. wireless protocols), the QoS Management entities 120 may each be enabled to translate and/or format QoS information as it passes from one network utilizing a first protocol to a second network utilizing a different protocol.

In various embodiments of the invention, the QoS management entity 120a may be enabled to negotiate with the QoS management entities 120c, 120d, and/or 120e to reserve resources in the network 108, 106, and/or 104, respectively. Additionally, the QoS management entities 120 may be enabled to reconcile traffic conflicts in a network. For example, two portable devices may have been alerted to available resources in a network and may have tried to begin transmitting. Consequently, there may not be sufficient resources available for traffic from both devices. Accordingly, the QoS manager within the conflicted network may, for example, be enabled to determine a priority of the traffic and/or devices in determining which traffic to carry and which traffic to deny/drop.

Additionally, each QoS management entity 120 may be enabled to translate and/or forward QoS information received from one or more down-stream QoS managers 120 to one or more up-stream QoS managers 120. For example, QoS information for the Ethernet network 110 may be communicated from the QoS manager 120f to the QoS manger 120e. Subsequently, the QoS information for the networks 104 and 110 may be communicated for the QoS manager 120e to the QoS manager 120a.

In an exemplary operation, the QoS manager 120a may obtain QoS information for the networks 108, 106, and 104 via the QoS manager 120c, 120d, and 120e, respectively. In one embodiment of the invention, the QoS management entity 102a may poll the QoS managers 120c, 120d, and 120e. For example, the manager 120a may transmit request on a dedicated QoS channel which may be periodically listened to by QoS managers. Accordingly, in-range remote QoS managers may respond on the dedicated channel. In another exemplary embodiment of the invention, the QoS managers 120c, 120d, and 120e may broadcast/advertise network QoS information. In this regard, the remote QoS managers may periodically transmit QoS information on the dedicated channel. In another exemplary embodiment, QoS information may be periodically transmitted on one or more channels. For example, QoS information may be transmitted when there is a change in any of the QoS information.

In an exemplary operation, a first WMCD, such as the WMCD 102a may transmit data to second WMCD via a first protocol, BT, for example, such that the second WMCD may transmit the data via a second protocol. In this regard, the second WMCD may sell its resources to the first WMCD. For example, the first WMCD may have limited battery power and thus may transfer the data via the lower power BT connection, while the second WMCD may have a longer battery life and may transmit the data via a higher power connection. In another example, the first WMCD may not be capable of communicating via the second protocol, and thus the second WMCD may offer routing possibilities not available to the first WMCD.

Figure 1C:
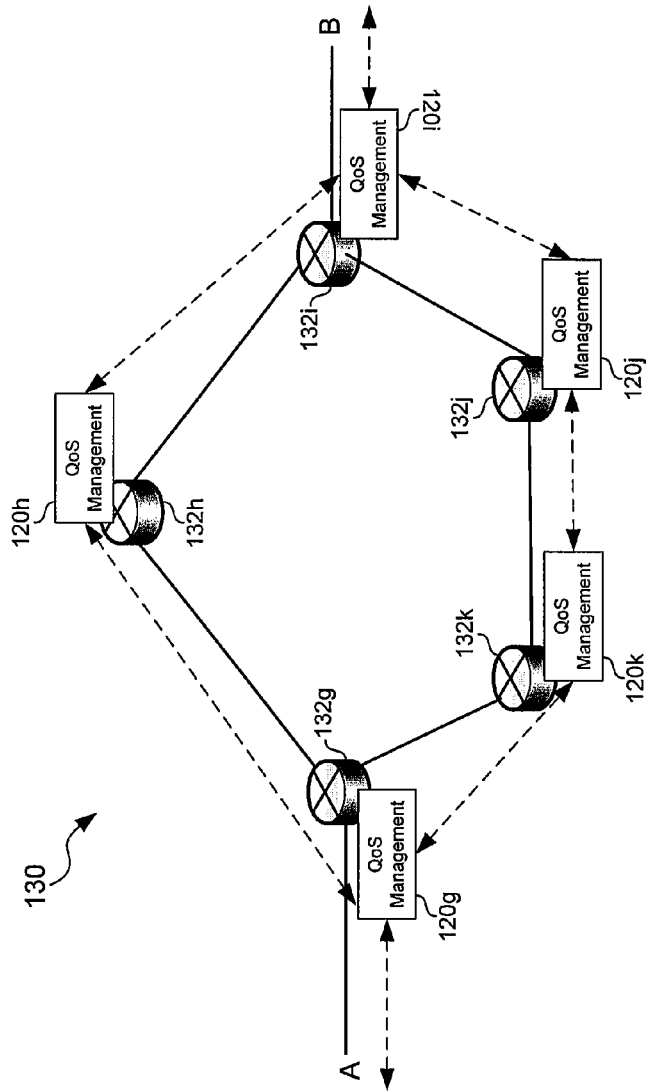
FIG. 1C illustrates QoS management in an exemplary network, in accordance with an embodiment of the invention.

FIG. 1C illustrates QoS management in an exemplary network, in accordance with an embodiment of the invention. Referring to FIG. 1C there is shown a network 130 comprising the QoS management entities 120g, 120h, 120i, 120j, 120k, and a plurality of network nodes 132g, 132h, 132i, 132j, 132k.

The network nodes 132g, 132h, 132i, 132j, 132k may comprise suitable logic, circuitry, and/or code that may enable receiving and/or forwarding of data in a network. The nodes 132 may be similar to or the same as the nodes 150, 152, 154, and 156 of FIG. 1A. In the embodiment of the invention depicted, each node may comprise a QoS management entity 120. In various other embodiments of the invention, the network 130 may comprise fewer QoS management entities, or may comprise a single QoS management entity which may provide QoS management for the network 130.

The QoS management entities 120g, 120h, 120i, 120j, 120k may be enabled to determine QoS information for the network 130. In this regard, the QoS management entities may enable determining latencies and throughput, for example, for the network 130. The QoS management entity 120 may also enable transmitting the determined QoS information to remote QoS management entities. Additionally, the QoS management entities 120g, 120h, 120i, 120j, 120k may be enabled to reserve resources in the various nodes 130 to provide, for example, guaranteed bandwidth to a remote device or network.

In an exemplary embodiment, for data traveling from A to B, nodes 132k and 132j may have higher throughput than the node 132b. Accordingly, the QoS management entities 120g, 120h, 120i, 120j, 120k may be enabled to identify the higher throughput path from A to B and advertise this path to remote QoS management entities. Similarly, the QoS management entity 120 may be enabled to determine that the path from A to B via the node 132h has lower latency, and may be enabled to advertise this minimum latency to remote QoS management entities. In this manner, a remote QoS manager with a large block of data may negotiate with one or more of the QoS management entities 120g, 120h, 120i, 120j, 120k to send the data from A to B via 132k and 132j. Similarly, a node with many small blocks of data may negotiate with the one or more of the QoS management entities 120g, 120h, 120i, 120j, 120k to send these blocks of data via the low latency path comprising the node 132h. In this manner, the one or more of the QoS management entities 120g, 120h, 120i, 120j, 120k may be enabled to allocate and/or de-allocate resources for specific sessions and/or traffic.

Figure 2:
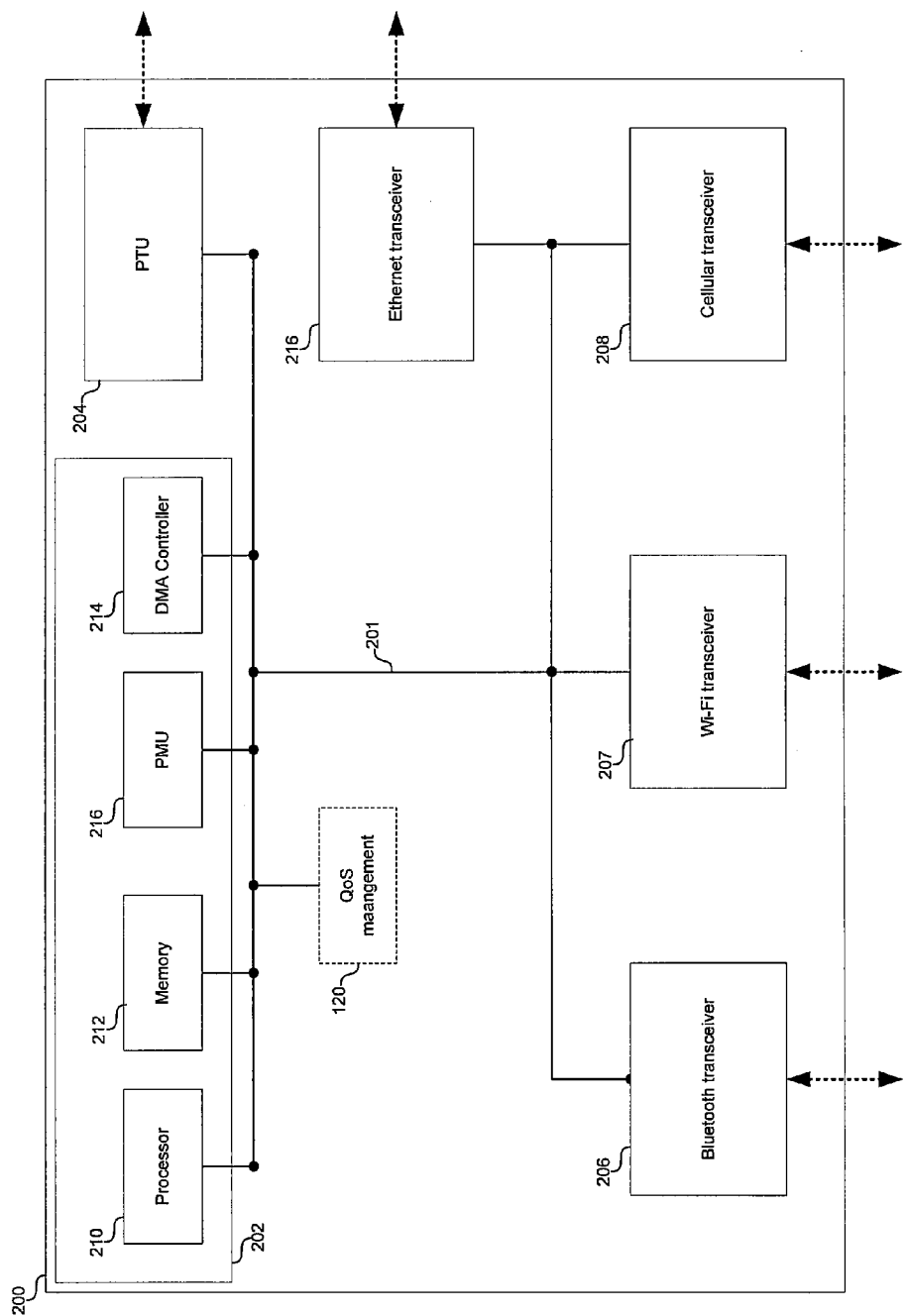
FIG. 2 is a block diagram of an exemplary single chip that supports multiple networking standards, in accordance with an embodiment of the invention.

FIG. 2 is a block diagram of an exemplary single chip that supports multiple networking standards, in accordance with an embodiment of the invention. Referring to FIG. 2, there is shown a system 200 that may comprise a processor subsystem 202, a peripheral transport unit (PTU) 204, a common bus 201, a Bluetooth transceiver 206, a WLAN transceiver 202, a cellular transceiver 208 and an Ethernet transceiver 216. Other exemplary transmitter and/or receiver devices may comprise WiMAX, Ultrawideband (UWB), DVB, and 60 GHz.

The processor subsystem 202 may comprise a central processing unit (CPU) 210, a memory 212, a direct memory access (DMA) controller 214, and a power management unit (PMU) 216. At least a portion of the components of the processor system 202 may be communicatively coupled via the common bus 201.

The CPU 210 may comprise suitable logic, circuitry, and/or code that may enable control and/or management operations in the single system 200. In this regard, the CPU 210 may communicate control and/or management operations to the Bluetooth transceiver 206, a WLAN transceiver 202, the cellular transceiver 208, the Ethernet transceiver 216, and/or the PTU 204 via a set of register locations specified in a memory map. Moreover, the CPU 210 may be utilized to process data received by the single system 200 and/or to process data to be transmitted by the single system 200. The CPU 210 may enable processing of data received via the Bluetooth transceiver 206, the WLAN transceiver 202, the cellular transceiver 208, the Ethernet transceiver 216, and/or via the PTU 204. For example, the CPU 210 may enable processing of A2DP data received from the Bluetooth core 206 via the common bus 201. The CPU 210 may then transfer the processed A2DP data to other components of the system 200 via the common bus 201. The CPU 210 may enable processing of data to be transmitted via the Bluetooth transceiver 206, the WLAN Transceiver 202, the Cellular Transceiver 208, the Ethernet transceiver 216, and/or via the PTU 204. The CPU 210 may be, for example, an ARM processor or another embedded processor core that may be utilized in the implementation of system-on-chip (SOC) architectures. The CPU 210 may enable providing one or more control signals to a hardware based QoS management entity 120. The CPU 210 may enable transferring data to/from the QoS management entity to the various other blocks comprising the system 200.

The memory 212 may comprise suitable logic, circuitry, and/or code that may enable data storage. In this regard, the memory 212 may be utilized to store data that may be utilized by the processor system 202 to control and/or manage the operations of the system 200. The memory 212 may also be utilized to store data received by the system 200 via the Bluetooth transceiver 206, the WLAN Transceiver 202, the Cellular Transceiver 208, the Ethernet transceiver 216, and/or the PTU 204. Similarly, the memory 212 may be utilized to store data to be transmitted by the system 200 via the Bluetooth transceiver 206, the WLAN Transceiver 202, the Cellular Transceiver 208, the Ethernet transceiver 216, and/or the PTU 204. The DMA controller 214 may comprise suitable logic, circuitry, and/or code that may enable transfer of data directly to and from the memory 212 via the common bus 201 without involving the operations of the CPU 210. The memory 212 may enable storing data utilized by the QoS management entity 120 to determine QoS information, for example latency, available bandwidth, and/or throughput, of a network comprising the system 200. Additionally, the memory 212 may store QoS information for one or more networks via which the system 200 may communicate.

The QoS management entity 120 may comprise suitable logic, circuitry, and/or code that may enable determining and/or communicating QoS information associated with a network. In this regard, the QoS management entity 120 may reside in dedicated hardware, and/or may comprise one or more blocks of code executed, for example, by the processor subsystem 202. Additionally, the QoS management entity may be implemented in whole, or in part, in one or more of the other blocks comprising the system 200.

The QoS management entity 120 may be enabled to determine QoS information associated with a network or networks in which the system 200 resides. In this regard, the QoS management entity 120 may, for example, analyze traffic received via the transceivers 206, 207, 208, and/or 216 to analyze determine, for example, latency, available bandwidth, and/or throughput of a network. In one embodiment of the invention, the QoS management entity 120 may be enabled to flag one or more packets received via the transceiver 206, 207, 208, and/or 216 and then track the packets through a network after forwarding it. In another embodiment of the invention, the QoS management entity 120 may generate test traffic to specifically measure and/or test various QoS information associated with a network.

The QoS management entity 120 may be enabled to communicate with other QoS management entities. In this manner, the QoS management entity 120, may communicate with other QoS management entities via the transceivers 206, 207, 208, and/or 216. In this regard, QoS information may be re-formatted or translated as it passes from a first QoS management entity in a first network to a second QoS management entity in a second network. Moreover, in one embodiment of the invention, the QoS management entity 120 may be enabled to negotiate with other QoS management entities to reserve resources in a network. Additionally, the QoS management entities 120 may be enabled to reconcile traffic conflicts in a network.

The PTU 204 may comprise suitable logic, circuitry, and/or code that may enable communication to and from the system 200 via a plurality of communication interfaces. In some instances, the PTU 204 may be implemented outside the system 200, for example. The PTU 204 may support analog and/or digital communication via at least one port. In this regard, the PTU may comprise, for example, one or more USB interfaces, serial interfaces, analog audio outputs, digital audio outputs, and/or one or more proprietary interfaces comprising a devices such as the smart phone of FIG. 1A.

The Bluetooth transceiver 206 may comprise suitable logic, circuitry, and/or code that may enable wireless reception and/or transmission of Bluetooth data. In this regard, the Bluetooth transceiver 206 may support amplification, filtering, modulation, and/or demodulation operations, for example. The Bluetooth transceiver 206 may enable data to be transferred from and/or to the processor system 202, the PTU 204, The WLAN transceiver 202, the cellular transceiver 208 and/or the Ethernet transceiver 216 via the common bus 201, for example. The Bluetooth transceiver 206 may enable receiving QoS data characterizing a remote Bluetooth device or Bluetooth network. Similarly the Bluetooth transceiver 206 may enable transmitting QoS data characterizing the network comprising the system 200 to a remote Bluetooth device or Bluetooth network.

The WLAN transceiver 207 may comprise suitable logic, circuitry, and/or code that may enable wireless reception and/or transmission of wireless networking, e.g. IEEE 802.11, data. In this regard, the WLAN transceiver 207 may support amplification, filtering, modulation, and/or demodulation operations, for example. The WLAN transceiver 207 may enable data to be transferred from and/or to the processor system 202, the PTU 204, The Bluetooth transceiver 206, the cellular transceiver 208 and/or the Ethernet transceiver 216 via the common bus 201, for example. The WLAN transceiver 207 may enable receiving QoS data characterizing a remote WLAN device or WLAN network. Similarly the WLAN transceiver 207 may enable transmitting QoS data characterizing the network comprising the system 200 to a remote WLAN device or WLAN network.

The cellular transceiver 208 may comprise suitable logic, circuitry, and/or code that may enable wireless reception and/or transmission of cellular data, for example CDMA and/or GSM. In this regard, the cellular transceiver 208 may support amplification, filtering, modulation, and/or demodulation operations, for example. The cellular transceiver 208 may enable data to be transferred from and/or to the processor system 202, the PTU 204, the Bluetooth transceiver, the WLAN transceiver 202, and/or the Ethernet transceiver 216 via the common bus 201, for example. The cellular transceiver 208 may enable receiving QoS data characterizing a remote Cellular device or Cellular network. Similarly the cellular transceiver 208 may enable transmitting QoS data characterizing the network comprising the system 200 to a remote cellular device or cellular network.

The Ethernet transceiver 216 may comprise suitable logic, circuitry, and/or code that may enable wireline reception and/or transmission of Ethernet packets. In this regard, the Ethernet transceiver 216 may comprise a physical network interface which may support amplification, filtering, modulation, and/or demodulation operations, for example. The Ethernet transceiver 216 may enable data to be transferred from and/or to the processor system 202, the PTU 204, the Bluetooth transceiver, the WLAN transceiver 202, and/or the cellular transceiver 208 via the common bus 201, for example. The Ethernet transceiver 216 may enable receiving QoS data characterizing a remote Ethernet device or Ethernet network. Similarly the Ethernet transceiver 216 may enable transmitting QoS data characterizing the network comprising the system 200 to a remote Ethernet device or Ethernet network.

In operation, portable device, such as the devices 102 of FIG. 1A, may comprise the system 200. At any given time, the portable device may have access to one or more networks utilizing one or more communication standards. Accordingly, when the portable device has data to transmit, the system 200 may be enabled to determine which networking protocol is best suited for transmitting the data. In this regard, the portable device may take several factors into account when deciding when and how to transmit data. For example, type, size, and/or destination of the data may all be factored into the decision of which network to utilize for transmitting the data. Accordingly, the QoS manger 120 may enable determining, for example, the latency, available bandwidth, and/or throughput that each route from source to destination may be able to provide at a given time, such that a decision may be made about which route to use. In this regard, each network may comprise a multi-standard system such as the system 200 and the systems may communicate network QoS information such as latencies and throughput with each other.

In one embodiment of the invention, the system may communicate network QoS information, such as latency, available bandwidth, and/or throughput via each of the transceivers 206, 207, 208, and 216. In this regard, network QoS information may be communicated in-band and/or out-of-band. For example, each network may dedicate a channel and/or frequency, which may or may not be within a band utilized for communicating general traffic, for communicating QoS information. Accordingly, a portable device seeking to discover available networks and/or associated QoS information may tune to the dedicated QoS channels and/or frequencies for each network protocol that the portable device is enabled. In another embodiment of the invention, a system such as the system 200 may transmit QoS information periodically via one or more channels and/or frequencies. In this regard, QoS information may be transmitted when there is a change in any of the QoS information. For example, when new traffic begins transmitting over a network, the QoS manager of that network may broadcast a new QoS message indicating the reduced available bandwidth and/or throughput. In another example, when an additional node is inserted into a network path, or when a network node fails, the QoS manager may transmit an updated QoS message indicating the increased latency.

Figure 3:
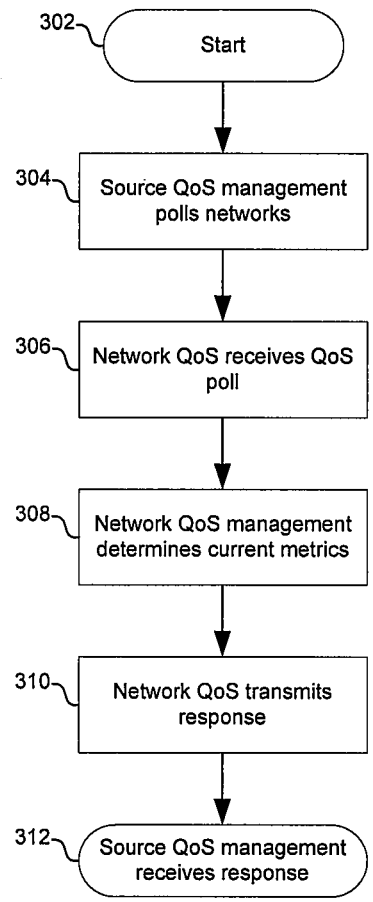
FIG. 3 is a flow chart illustrating exemplary steps for determining network QoS information via QoS management entities, in accordance with an embodiment of the invention.

FIG. 3 is a flow chart illustrating exemplary steps for determining network QoS information via QoS management entities, in accordance with an embodiment of the invention. Referring to FIG. 3, the exemplary steps may begin with start step 302. Subsequent to step 302 the exemplary steps may advance to step 304. In step 304, first a QoS management entity 120 residing in a source device, the device 102a, for example, may transmit a polling signal to a network, the Cellular network 108, for example, in order to determine QoS information of the network. In this regard, the QoS information may comprise, for example, latency and/or throughput. Subsequent to step 304, the exemplary steps may advance to step 306. In step 306, a second QoS management entity 120 within the network, the QoS management entity 120c, for example, may receive the polling signal. Subsequent to step 306, the exemplary steps may advance to step 308. In step 308, the second QoS management entity 120 may determine QoS information associated with the network. In this regard, QoS information such as latency (average, maximum, and/or minimum) and throughput (average, maximum, and/or minimum) may be determined by analyzing existing traffic in the network or generating test data to characterize the network. Subsequent to step 308, the exemplary steps may advance to step 310. In step 310, the second QoS management entity 120 may transmit a response to the polling signal. In this regard, the response packet may comprise the QoS information determined in step 308. Subsequent to step 310, the exemplary steps may advance to step 312. In step 312, the first QoS manager 120 may receive the network QoS information. In this manner, the QoS information may be utilized in a determination of whether the network meets any requirements for data to be transmitted.

Figure 4:
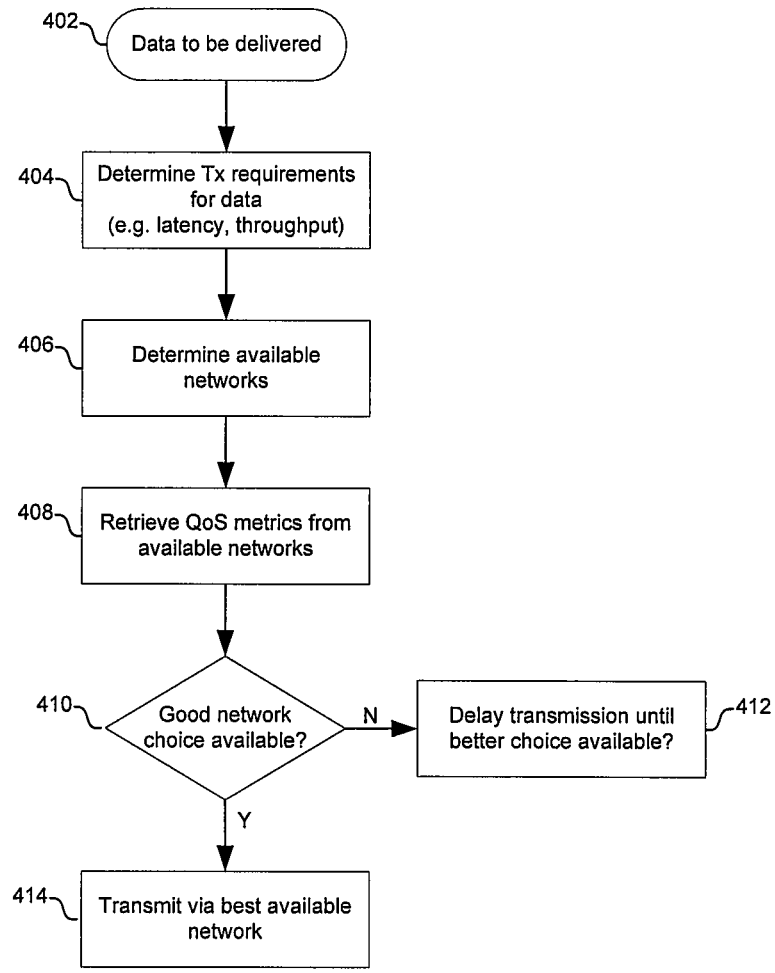
FIG. 4 is a flow chart illustrating exemplary steps for transmitting data utilizing QoS management, in accordance with an embodiment of the invention.

FIG. 4 is a flow chart illustrating exemplary steps for transmitting data utilizing QoS management, in accordance with an embodiment of the invention. Referring to FIG. 4, the steps may begin with step 402 when a device, such as the device 102a, has data that needs to be transmitted. Subsequent to step 402, the exemplary steps may advance to step 404. In step 404, the device of step 402 may determine network and/or route requirements for delivery of the data. In this regard, the device of step 402 may determine whether the data would be best delivered via, for example, a low latency network and/or route or a high bandwidth network and/or route. In this regard, a route may comprise a series of networks, each of which may utilize a different protocol, utilized to transmit data between a source and a destination. Accordingly, a single network type may not be available for the entire path from source to destination, however, QoS management entities may be enabled to determine the optimum choice at each point in a route where two or more networks are available.

Subsequent to step 404, the exemplary steps may advance to step 406. In step 406, the device of step 402 may determine networks and/or routes currently available for transmitting data. In this regard, the device of step 402 may scan for network signals or may transmit one or more signals in an attempt to detect any networks and/or routes. Subsequent to step 406, the exemplary steps may advance to step 408. In step 408, the device of step 402 may determine the QoS information of any available networks and/or route. In this regard, steps such as the exemplary steps described in FIG. 3 may be performed. Subsequent to step 408, the exemplary steps may advance to step 410. In step 410, the device of step 402 may determine whether a suitable network and/or route is available for transmitting the data. In this regard, factors such as criticality, urgency, type, and size of the data may be weighed against, for example, cost of transmission in terms of money and/or battery life. Accordingly, in instances where a suitable network and/or route may be available or the data may be urgent or high priority data, for example, the exemplary steps may advance to step 412. In step 412 the data may be transmitted via the best available network. Returning to step 410, if the data is not urgent, or a suitable network and/or route is not present, the steps may advance to step 414. In step 414 the data may be stored for transmission at a later time.

In a WMCD, such as the device 102a of FIG. 1A, enabled to communicate over a variety of communication networks, such as the networks 104, 106, 108, and 110 of FIG. 1A, aspects of the invention may enable the coordination of the transfer of data to and/or from the WMCD based on QoS information pertaining to said networks, communicated to the WMCD. In this regard, the WMCD and each of the networks may comprise a QoS management entity 120. In one embodiment of the invention, a QoS management entity 120 within the WMCD may be enabled to poll other QoS management entities within the various networks to discover QoS information associated with the networks. Similarly, the QoS management entity 120 residing in the WMCD may be enabled to receive QoS information broadcast by the QoS management entities 120 residing in the various networks. In various embodiments of the invention, QoS information, such as latency, available bandwidth and/or throughput, may be exchanged upon a status change in that information. For example, if a node such as the node 132b of FIG. 1C fails, the network 130 may experience increased latencies and/or reduced throughput. Accordingly, a QoS manager 120 associated with the network 130, may transmit the new throughput and latency values to, for example, an WMCD in range of the network 130. Aspects of the invention may also enable negotiation between QoS management entities to enable the reservation of resources for the transfer of data to and/or from the WMCD to a network. For example, a QoS management entity 120 may enable reserving resources in the nodes 132 of FIG. 1C. In various embodiments of the invention, a QoS management entity 120 may enable selecting a network and/or communication protocol for the transmission and/or reception of data based on exchanged QoS information.

Another embodiment of the invention may provide a machine-readable storage, having stored thereon, a computer program having at least one code section executable by a machine, thereby causing the machine to perform the steps as described herein for quality of service management in a multi-standard mesh of networks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing network communication, the method comprising:
   in a first wireless mobile communication device (WMCD) comprising a first Quality of Service (QoS) management entity that manages QoS for a plurality of wireless protocols handled by said WMCD:
      determining, based on QoS information communicated between said first QoS management entity and a second QoS management entity residing in a second WMCD, whether said second WMCD has available resources for communicating data over a higher-power dissipating connection, said QoS information being communicated via a dedicated wireless QoS channel, wherein the dedicated wireless QoS channel is one of a plurality of dedicated wireless QoS channels and each of the plurality of wireless protocols corresponds to a unique one of the plurality of dedicated wireless QoS channels; and
      communicating, based on said determining, said data from said first WMCD to said second WMCD via a lower-power dissipating wireless connection to enable said second WMCD to subsequently transmit said communicated data via said higher-power dissipating connection.

2. The method according to claim 1, comprising receiving said QoS information from said second QoS management entity residing in said second WMCD.

3. The method according to claim 1, wherein said second QoS management entity communicates said QoS information to said first QoS management entity only when a network in which said second QoS management entity resides meets minimum QoS requirements.

4. The method according to claim 1, wherein said QoS information communicated between said first and second QoS management entities includes QoS information for a network in which said second QoS management entity resides and for down-stream networks, wherein said down-stream networks are along a route from said second WMCD to a source or destination of said data.

5. The method according to claim 1, wherein said QoS information is communicated as a result of said first QoS management entity polling one or more other QoS management entities.

6. The method according to claim 1, wherein said QoS information is communicated as a result of said first QoS management entity requesting said QoS information from said second QoS management entity.

7. The method according to claim 1, comprising negotiating with said second QoS management entity to coordinate said communicating of said data.

8. The method according to claim 3, wherein said minimum QoS requirements comprise one or more of: power dissipation requirements and monetary cost requirements.

9. A non-transitory computer readable medium having stored thereon, a computer program having at least one code section for providing network communication, the at least one code section being executable by a computer for causing the computer to perform steps comprising:
   in a first wireless mobile communication device (WMCD) comprising a first Quality of Service (QoS) management entity that manages QoS for a plurality of wireless protocols handled by said WMCD:
      determining, based on QoS information communicated between said first QoS management entity and a second QoS management entity residing in a second WMCD, whether said second WMCD has available resources for communicating data over a higher-power dissipating connection, a portion of said QoS information being communicated upon a change in said available resources via a dedicated wireless QoS channel, wherein the dedicated wireless QoS channel is one of a plurality of dedicated wireless QoS channels and each of the plurality of wireless protocols corresponds to a unique one of the plurality of dedicated wireless QoS channels; and
      communicating, based on said determining, said data from said first WMCD to said second WMCD via a lower-power dissipating wireless connection to enable said second WMCD to subsequently transmit said communicated data via said higher-power dissipating connection.

10. The non-transitory computer readable medium according to claim 9, wherein said at least one code section comprises code for receiving said QoS information from said second QoS management entity residing in said second WMCD.

11. The non-transitory computer readable medium according to claim 9, wherein said second QoS management entity communicates said QoS information to said first QoS management entity only when a network in which said second QoS management entity resides meets minimum QoS requirements.

12. The non-transitory computer readable medium according to claim 9, said QoS information communicated between said first and second QoS management entities includes QoS information for a network in which said second QoS management entity resides and for down-stream networks, wherein said down-stream networks are along a route from said second WMCD to a source or destination of said data.

13. The non-transitory computer readable medium according to claim 9, wherein said QoS information is communicated as a result of said first QoS management entity polling one or more other QoS management entities.

14. The non-transitory computer readable medium according to claim 9, wherein said QoS information is communicated as a result of said first QoS management entity requesting said QoS information from said second QoS management entity.

15. The non-transitory computer readable medium according to claim 9, wherein said at least one code section comprises code for negotiating with said second QoS management entity to coordinate said communicating of said data.

16. The non-transitory computer readable medium according to claim 11, wherein said minimum QoS requirements comprise one or more of: power dissipation requirements and monetary cost requirements.

17. A system for providing network communication, the system comprising:
   one or more circuits in a first wireless mobile communication device (WMCD), said one or more circuits comprising a first Quality of Service (QoS) management entity that is operable to manage QoS for a plurality of wireless protocols handled by said WMCD, wherein said one or more circuits are operable to:
      determine, based on QoS information communicated between said first QoS management entity and a second QoS management entity residing in a second WMCD, whether said second WMCD has available resources for communicating data over a higher-power dissipating connection, said QoS information being communicated via a dedicated wireless QoS channel wherein the dedicated wireless QoS channel is one of a plurality of dedicated wireless QoS channels and each of the plurality of wireless protocols corresponds to a unique one of the plurality of dedicated wireless QoS channels; and
      communicating, based on said determining, said data from said first WMCD to said second WMCD via a lower-power dissipating wireless connection to enable said second WMCD to subsequently transmit said communicated data via said higher-power dissipating connection.

18. The system according to claim 17, wherein said one or more circuits are operable to receive said QoS information from said second QoS management entity residing in said second WMCD.

19. The system according to claim 17, wherein said second QoS management entity communicates said QoS information to said first QoS management entity only when a network in which said second QoS management entity resides meets minimum QoS requirements.

20. The system according to claim 17, wherein said QoS information communicated between said first and second QoS management entities includes QoS information for a network in which said second QoS management entity resides and for down-stream networks, wherein said down-stream networks are along a route from said second WMCD to a source or destination of said data.

21. The system according to claim 17, wherein said QoS information is communicated as a result of said first QoS management entity polling one or more other QoS management entities.

22. The system according to claim 17, wherein said QoS information is communicated as a result of said first QoS management entity requesting said QoS information from at least one of said one or more other said second QoS management entity.

23. The system according to claim 17, wherein said one or more circuits are operable to negotiate with said second QoS management entity to coordinate said communicating of said data.

24. The system according to claim 19, wherein said minimum QoS requirements comprise one or more of: power dissipation requirements and monetary cost requirements.

25. The method according to claim 1, comprising generating test traffic and tracking said test traffic as said test traffic traverses a network in which said first QoS management entity resides.

26. The non-transitory computer readable medium according to claim 9, wherein said at least one code section comprises code for generating test traffic and tracking said test traffic as said test traffic traverses a network in which said first QoS management entity resides.

27. The system according to claim 17, wherein said one or more circuits are operable to generate test traffic and track said test traffic as said test traffic traverses a network in which said first QoS management entity resides.

28. A method for providing network communication, the method comprising:
  in a first wireless mobile communication device (WMCD) comprising a first Quality of Service (QoS) management entity that manages QoS for a plurality of wireless protocols handled by said WMCD:
    determining, based on QoS information communicated between said first QoS management entity and a second QoS management entity residing in a second WMCD, whether said second WMCD has available resources for communicating data over a lower-power dissipating connection, a portion of said QoS information being communicated upon a change in said available resources, via a dedicated wireless QoS channel, wherein the dedicated wireless QoS channel is one of a plurality of dedicated wireless QoS channels and each of the plurality of wireless protocols corresponds to a unique one of the plurality of dedicated wireless QoS channels; and
    communicating, based on said determining, said data from said first WMCD to said second WMCD via a higher-power dissipating wireless connection to enable said second WMCD to subsequently transmit said communicated data via said lower-power dissipating connection.

* * * * *